United States Patent
Alesch et al.

(10) Patent No.: US 12,442,188 B2
(45) Date of Patent: Oct. 14, 2025

(54) DEVICES, SYSTEMS, AND METHODS FOR CONNECTING CONCRETE STRUCTURAL ELEMENTS

(71) Applicant: TINDALL CORPORATION, Spartanburg, SC (US)

(72) Inventors: Matthew Alesch, Conley, GA (US); John Michael Romano, Conley, GA (US); Bryant Zavitz, Conley, GA (US); Kevin Kirkley, Conley, GA (US)

(73) Assignee: TINDALL CORPORATION, Spartanburg, SC (US)

( * ) Notice: Subject to any disclaimer, the term of this patent is extended or adjusted under 35 U.S.C. 154(b) by 159 days.

(21) Appl. No.: 18/561,606

(22) PCT Filed: May 23, 2022

(86) PCT No.: PCT/US2022/030580
§ 371 (c)(1),
(2) Date: Nov. 16, 2023

(87) PCT Pub. No.: WO2022/251133
PCT Pub. Date: Dec. 1, 2022

(65) Prior Publication Data
US 2024/0254770 A1 Aug. 1, 2024

Related U.S. Application Data

(60) Provisional application No. 63/193,967, filed on May 27, 2021.

(51) Int. Cl.
*E04C 5/10* (2006.01)
*F16L 25/00* (2006.01)

(52) U.S. Cl.
CPC ............. *E04C 5/10* (2013.01); *F16L 25/0027* (2013.01)

(58) Field of Classification Search
CPC ............................ E04C 5/10; F16L 25/0027
See application file for complete search history.

(56) References Cited

U.S. PATENT DOCUMENTS

| 7,267,375 | B1 | 9/2007 | Sorkin | |
| 9,493,951 | B2* | 11/2016 | Sorkin | E04C 5/10 |
| 10,519,659 | B2* | 12/2019 | Zavitz | E04C 5/10 |

(Continued)

OTHER PUBLICATIONS

International Search Report and Written Opinion received in PCT/US2022/030580 mailed Sep. 1, 2022.

*Primary Examiner* — Rodney Mintz
(74) *Attorney, Agent, or Firm* — Meunier Carlin & Curfman LLC

(57) ABSTRACT

Various implementations include a duct coupler including a body, a first and second arm, and a first and second tooth. The body has a first end that faces a first axial direction, a second end that faces a second axial direction, and a wall. The first and second arm each have a fixed end coupled to the second end and free end axially spaced apart from the fixed end. Each of the free ends are resiliently urgeable in a radial direction. The first tooth is coupled to the first arm, and the second tooth is coupled to the second arm. The teeth are shaped such that, when the teeth are engaged with a corrugation of a corrugated duct, the teeth allow the duct coupler to move in the first axial direction with less axial force than moving the duct coupler in the second axial direction.

28 Claims, 7 Drawing Sheets

(56) References Cited

U.S. PATENT DOCUMENTS

| | | |
|---|---|---|
| 11,473,302 B2 * | 10/2022 | Hunsicker ............... F16L 23/18 |
| 2011/0101679 A1 | 5/2011 | Crigler et al. |
| 2015/0330544 A1 | 11/2015 | Sorkin |
| 2017/0350126 A1 | 12/2017 | Hunsicker et al. |
| 2018/0363290 A1 * | 12/2018 | Zavitz ....................... E04C 5/10 |

* cited by examiner

DEVICES, SYSTEMS, AND METHODS FOR CONNECTING CONCRETE STRUCTURAL ELEMENTS

CROSS-REFERENCE TO RELATED APPLICATION

This application is a U.S. National Stage application filed under 35 U.S.C. § 371 of PCT/US2022/030580 filed May 23, 2022, which claims priority to and benefit of U.S. provisional patent application Ser. No. 63/193,967 filed May 27, 2021, each of which is hereby incorporated by reference herein in their entirety.

BACKGROUND

Current precast concrete components are sometimes formed with corrugated post-tensioning ducts through which post-tensioning tendons can be run. Two or more concrete components can be arranged such that the post-tensioning ducts embedded within the concrete components are aligned with each other. The concrete components can then be grouted together to form a monolithic structure, and once the grout has set, a post-tensioning tendon can be threaded through the aligned post-tensioning ducts embedded within the monolithic structure.

However, during the grouting process, the aligned post-tensioning ducts and a path between the ends of the aligned post-tensioning ducts must be kept clear of grout so that the post-tensioning tendon can be threaded through the post-tensioning ducts. Conventional devices, systems, and methods for preventing grout from entering the aligned post-tensioning ducts and connecting the aligned post-tensioning ducts are labor intensive, difficult to access, and slow to use.

Thus, a need exists for easier, more convenient, and more efficient devices, systems, and methods for preventing grout from entering the aligned post-tensioning ducts embedded within precast concrete components.

SUMMARY

Various implementations include a duct coupler. The duct coupler includes a tubular coupler body, a first arm, a second arm, a first tooth, and a second tooth. The tubular coupler body has a central axis, a first end, a second end axially spaced apart from the first end, and a wall extending between the first end and the second end. The first end faces a first axial direction, and the second end faces a second axial direction.

Each of the first arm and the second arm has a fixed end and a free end. The fixed end is coupled to the second end and extends axially therefrom, and the free end is axially spaced apart from the fixed end. Each of the free ends are resiliently urgeable in a radial direction. The first tooth is coupled to and extends radially from the first arm, and the second tooth is coupled to and extends radially from the second arm.

The first tooth is shaped such that, when the first tooth is engaged with a corrugation of a corrugated duct, the first tooth allows the duct coupler to move in the first axial direction with less axial force than moving the duct coupler in the second axial direction. The second tooth is shaped such that, when the second tooth is engaged with the corrugation of the corrugated duct, the second tooth allows the duct coupler to move in the first axial direction with less axial force than moving the duct coupler in the second axial direction.

In some implementations, the first tooth and the second tooth are configured such that the first tooth does not engage the corrugation of the corrugated duct when the second tooth is engaging the corrugation of the corrugated duct.

In some implementations, the teeth extend radially outwardly. In some implementations, the teeth extend radially inwardly.

In some implementations, the duct coupler further includes a flange that extends radially outwardly from the first end. In some implementations, the flange includes a flange seal.

In some implementations, the first tooth extends radially from the free end of the first arm, and the second tooth extends radially from the free end of the second arm.

In some implementations, a distal end of the first tooth is axially spaced apart from the second end of the tubular body a first length, and a distal end of the second tooth is axially spaced apart from the second end of the tubular body a second length. The first and the second lengths are different.

In some implementations, the first tooth and the second tooth are diametrically opposed.

In some implementations, the duct coupler further includes a third arm, a fourth arm, a third tooth coupled to and extending radially from the third arm, and a fourth tooth coupled to and extending radially from the fourth arm. The first tooth and the third tooth are configured to engage the corrugation of the corrugated duct simultaneously, the second tooth and the fourth tooth are configured to engage the corrugation of the corrugated duct simultaneously, and the first tooth and the third tooth do not engage the corrugation of the corrugated duct when the second tooth and the fourth tooth are engaging the corrugation of the corrugated duct. In some implementations, the first tooth and the third tooth are diametrically opposed, and the second tooth and the fourth tooth are diametrically opposed.

In some implementations, each of the teeth extend helically along their respective free end. In some implementations, the teeth extend helically along their respective free end at a helical angle corresponding to a helical angle of the corrugation of the corrugated duct.

In some implementations, each of the free ends are resiliently urgeable radially inwardly.

In some implementations, the first tooth and the second tooth are configured such that the first tooth is engaging the corrugation of the corrugated duct when the second tooth is engaging the corrugation of the corrugated duct.

In some implementations, the teeth are shaped such that, when at least one of the teeth is engaged with the corrugation of the corrugated duct, rotation of the duct coupler in a first circumferential direction about the central axis causes the duct coupler to move in the first axial direction and rotation of the duct coupler in a second circumferential direction opposite the first circumferential direction about the central axis causes the duct coupler to move in the second axial direction.

In some implementations, an inner surface of the wall includes a flared portion, wherein the flared portion includes the first end.

In some implementations, the coupler body is a circular shape as viewed in a plane perpendicular to the central axis. In some implementations, the coupler body is a square shape as viewed in a plane perpendicular to the central axis.

Various other implementations include a duct coupler system. The system includes a duct coupler such as the duct coupler described above and a duct adapter. The duct adapter includes a tubular adapter body having an adapter central axis, a coupler engagement portion, a duct engagement portion axially spaced apart from the coupler engagement portion, and an adapter wall. The adapter wall has an inner surface. The inner surface of the adapter wall of the coupler engagement portion defines one or more grooves. The duct engagement portion is configured to be coupled to an end of a duct.

The first tooth is shaped such that, when the first tooth is engaged with the one or more grooves of the adapter wall, the first tooth allows the duct coupler to move in the first axial direction with less axial force than moving the duct coupler in the second axial direction. The second tooth is shaped such that, when the second tooth is engaged with the corrugation of the corrugated duct, the second tooth allows the duct coupler to move in the first axial direction with less axial force than moving the duct coupler in the second axial direction.

In some implementations, the first tooth and the second tooth are configured such that the first tooth does not engage the corrugation of the corrugated duct when the second tooth is engaging the corrugation of the corrugated duct.

In some implementations, the teeth extend radially outwardly. In some implementations, the teeth extend radially inwardly.

In some implementations, the duct coupler further includes a flange that extends radially outwardly from the first end. In some implementations, the flange includes a flange seal.

In some implementations, the first tooth extends radially from the free end of the first arm, and the second tooth extends radially from the free end of the second arm.

In some implementations, a distal end of the first tooth is axially spaced apart from the second end of the tubular body a first length, and a distal end of the second tooth is axially spaced apart from the second end of the tubular body a second length. The first and the second lengths are different.

In some implementations, the first tooth and the second tooth are diametrically opposed.

In some implementations, the duct coupler further includes a third arm, a fourth arm, a third tooth coupled to and extending radially from the third arm, and a fourth tooth coupled to and extending radially from the fourth arm. The first tooth and the third tooth are configured to engage the one or more grooves of the adapter wall simultaneously, the second tooth and the fourth tooth are configured to engage the one or more grooves of the adapter wall simultaneously, and the first tooth and the third tooth do not engage the one or more grooves of the adapter wall when the second tooth and the fourth tooth are engaging the one or more grooves of the adapter wall. In some implementations, the first tooth and the third tooth are diametrically opposed, and the second tooth and the fourth tooth are diametrically opposed.

In some implementations, each of the teeth extend helically along their respective free end. In some implementations, the teeth extend helically along their respective free end at a helical angle corresponding to a helical angle of the one or more grooves of the adapter wall.

In some implementations, each of the free ends are resiliently urgeable radially inwardly.

In some implementations, the first tooth and the second tooth are configured such that the first tooth is engaging the corrugation of the corrugated duct when the second tooth is engaging the corrugation of the corrugated duct.

In some implementations, the teeth are shaped such that, when at least one of the teeth is engaged with the one or more grooves of the adapter wall, rotation of the duct coupler in a first circumferential direction about the body central axis causes the duct coupler to move in the first axial direction and rotation of the duct coupler in a second circumferential direction opposite the first circumferential direction about the body central axis causes the duct coupler to move in the second axial direction.

In some implementations, an inner surface of the wall of the body includes a flared portion, wherein the flared portion includes the first end.

In some implementations, the coupler body is a circular shape as viewed in a plane perpendicular to the body central axis. In some implementations, the coupler body is a square shape as viewed in a plane perpendicular to the body central axis.

In some implementations, the one or more grooves includes one or more threads. In some implementations, the one or more grooves extend circumferentially.

In some implementations, the adapter body includes a first portion and a second portion, the first portion and the second portion being coupled to each other along a plane that includes the adapter central axis.

In some implementations, the duct adapter is embedded in a concrete component. In some implementations, the duct adapter is a first duct adapter and the concrete component is a first concrete component. The system further includes a second duct adapter embedded in a second concrete component. The adapter central axis of the first duct adapter is aligned with an adapter central axis of the second duct adapter.

Various other implementations include a duct system. The duct system includes a precast concrete component and a duct. The precast concrete component has an outer surface defining a component opening. The component opening has an inner surface. The duct is embedded within the precast component. The duct has a duct end defining a duct opening. The duct end is spaced apart from the outer surface such that the component opening is in communication with the duct opening. The inner surface of the component opening includes a tapered recessed portion adjacent the duct opening.

In some implementations, the inner surface of the tapered recessed portion is frustoconical.

In some implementations, the inner surface of the tapered recessed portion is frustospherical.

In some implementations, the duct coupling system further includes a duct coupler such as the duct couplers described above. An outer diameter of the first end is greater than an inner diameter of the duct and the first end is configured to abut the inner surface of the component opening.

In some implementations, the first end is configured to abut the tapered recessed portion of the inner surface.

In some implementations, the first tooth and the second tooth are configured such that the first tooth does not engage the corrugation of the corrugated duct when the second tooth is engaging the corrugation of the corrugated duct.

In some implementations, the teeth extend radially outwardly. In some implementations, the teeth extend radially inwardly.

In some implementations, the duct coupling system further includes a flange that extends radially outwardly from the first end. In some implementations, the flange includes a flange seal.

In some implementations, the first tooth extends radially from the free end of the first arm and the second tooth extends radially from the free end of the second arm.

In some implementations, a distal end of the first tooth is axially spaced apart from the second end of the tubular body a first length, and a distal end of the second tooth is axially spaced apart from the second end of the tubular body a second length. The first and the second lengths are different.

In some implementations, the first tooth and the second tooth are diametrically opposed.

In some implementations, the duct coupling system further includes a third arm, a fourth arm, a third tooth coupled to and extending radially from the third arm, and a fourth tooth coupled to and extending radially from the fourth arm. The first tooth and the third tooth are configured to engage the corrugation of the corrugated duct simultaneously, the second tooth and the fourth tooth are configured to engage the corrugation of the corrugated duct simultaneously, and the first tooth and the third tooth do not engage the corrugation of the corrugated duct when the second tooth and the fourth tooth are engaging the corrugation of the corrugated duct. In some implementations, the first tooth and the third tooth are diametrically opposed, and the second tooth and the fourth tooth are diametrically opposed.

In some implementations, each of the teeth extend helically along their respective free end. In some implementations, the teeth extend helically along their respective free end at a helical angle corresponding to helical angle of the corrugation of the corrugated duct.

In some implementations, each of the free ends are resiliently urgeable radially inwardly.

In some implementations, the first tooth and the second tooth are configured such that the first tooth is engaging the corrugation of the corrugated duct when the second tooth is engaging the corrugation of the corrugated duct.

In some implementations, the teeth are shaped such that, when at least one of the teeth is engaged with the corrugation of the corrugated duct, rotation of the duct coupler in a first circumferential direction about the body central axis causes the duct coupler to move in the first axial direction and rotation of the duct coupler in a second circumferential direction opposite the first circumferential direction about the body central axis causes the duct coupler to move in the second axial direction.

In some implementations, an inner surface of the wall includes a flared portion, and the flared portion includes the first end.

In some implementations, the coupler body is a circular shape as viewed in a plane perpendicular to the body central axis. In some implementations, the coupler body is a square shape as viewed in a plane perpendicular to the body central axis.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

Figure 1:
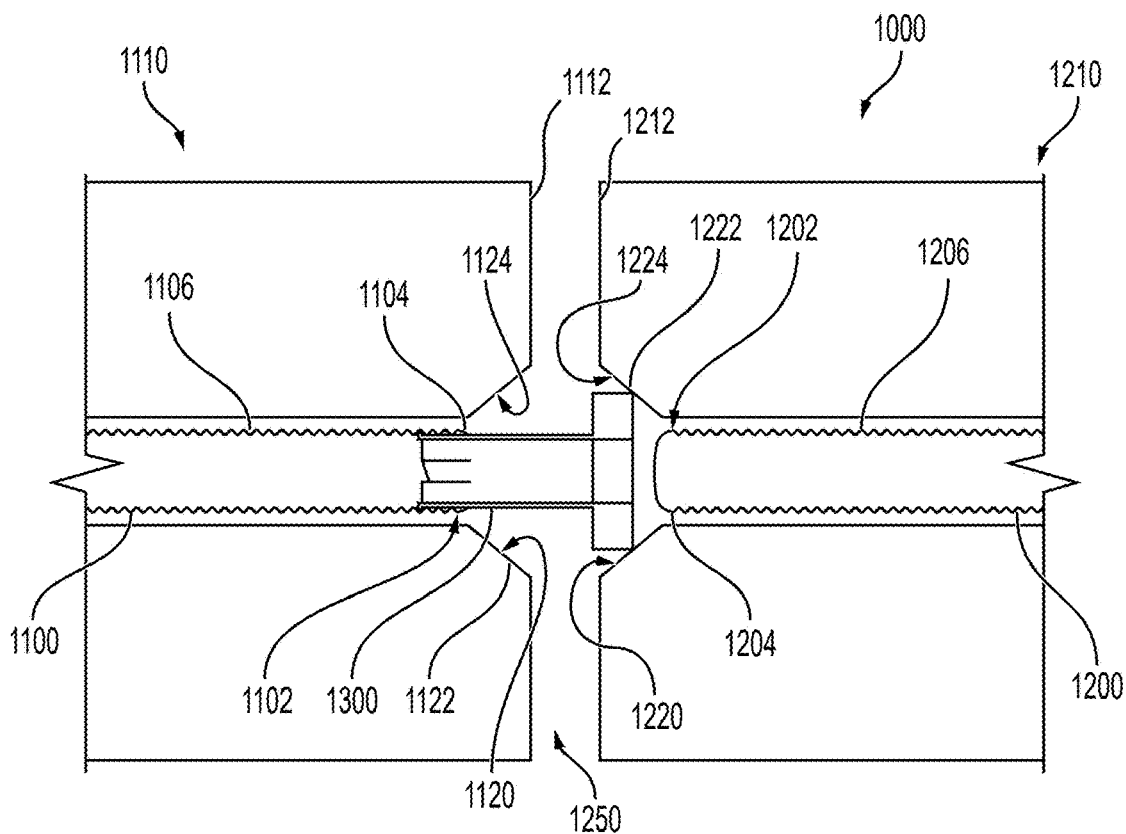
FIG. 1 is a side view of a duct system, according to one implementation.

Various implementations of the devices, systems, and methods disclosed herein provide for a duct coupler that spans a gap between aligned post-tensioning corrugated ducts embedded in adjacent precast concrete components. The duct coupler includes teeth that engage the corrugations of the corrugated post-tensioning duct such that the duct coupler can be ratcheted from the corrugated duct to bridge the gap between the adjacent precast concrete components. The duct coupler creates a seal against the adjacent precast concrete component to keep the aligned corrugated post-tensioning ducts of the adjacent precast concrete components clear of grout. Other disclosed systems include the concrete components and corrugated post-tensioning ducts.

For example, according to various implementations, a duct coupler includes a tubular coupler body, a first arm and a second arm, and a first tooth and a second tooth. The tubular coupler body has a central axis, a first end, a second end axially spaced apart from the first end, and a wall. The wall extends between the first end and the second end. The first end faces a first axial direction, and the second end faces a second axial direction. The first arm and the second arm each have a fixed end and a free end. Each fixed end is coupled to the second end of the tubular coupler body and extends axially therefrom. Each free end is axially spaced apart from the fixed end. Each of the free ends are resiliently urgeable in a radial direction. The first tooth is coupled to and extends radially from the first arm, and the second tooth is coupled to and extends radially from the second arm. The first tooth is shaped such that, when the first tooth is engaged with a corrugation of a corrugated duct, the first tooth allows the duct coupler to move in the first axial direction with less axial force than moving the duct coupler in the second axial direction. The second tooth is shaped such that, when the second tooth is engaged with a corrugation of a corrugated duct, the second tooth allows the duct coupler to move in the first axial direction with less axial force than moving the duct coupler in the second axial direction.

Various other implementations include a duct coupler system that includes a duct coupler similar to the duct coupler described above and a duct adapter. The duct adapter includes a tubular adapter body. The tubular adapter body has an adapter central axis, a coupler engagement portion, and a duct engagement portion axially spaced apart from the coupler engagement portion, and an adapter wall. The adapter wall has an inner surface. The inner surface of the adapter wall of the coupler engagement portion defines one or more grooves. The duct engagement portion is configured to be coupled to an end of a duct. The duct coupler engages with the coupler engagement portion of the duct adapter, instead of with the corrugated duct as described above. The first tooth of the duct coupler is shaped such that, when the first tooth is engaged with the one or more grooves of the adapter wall, the first tooth allows the duct coupler to move in the first axial direction with less axial force than moving the duct coupler in the second axial direction.

Various other implementations include a duct system that includes a precast concrete component and a duct. The precast concrete component has an outer surface that defines a component opening. The component opening has an inner surface. The duct is embedded within the precast component and has a duct end defining a duct opening. The duct end is spaced apart from the outer surface such that the component opening is in communication with the duct opening. The inner surface of the component opening includes a tapered recessed portion adjacent the duct opening.

Various other implementations include a system that includes the duct system and the duct coupler and/or the duct coupler system described above.

FIG. 1 shows an example duct system 1000 according to one implementation. The duct system 1000 includes a first corrugated post-tensioning duct 1100 embedded in a first precast concrete component 1110, a second corrugated post-tensioning duct 1200 embedded in a second precast concrete component 1210, and a duct coupler 1300 inserted into a duct opening 1104 of the first corrugated post-tensioning duct 1100.

The first concrete component 1110 has an outer surface 1112 that faces an outer surface 1212 of the second concrete component 1210. The outer surface 1112 of the first concrete component 1110 defines a first component opening 1120, and the outer surface 1212 of the second concrete component 1210 defines a second component opening 1220.

The first and the second concrete components 1110, 1210 are disposed such that the first and second component openings 1120, 1220 are axially aligned with each other.

Each of the first and second corrugated post-tensioning ducts 1100, 1200 has a duct end 1102, 1202 that defines a duct opening 1104, 1204, respectively. Each of the duct ends 1102, 1202 is spaced apart from the outer surfaces 1112, 1212 of their respective concrete component 1110, 1210 and is centrally aligned with, and in communication with, the component opening 1120, 1220 of their respective concrete component 1110, 1210. Each corrugated post-tensioning duct 1100, 1200 shown in FIGS. 1-4 has a hollow circular cross section as viewed in a plane perpendicular to a central axis of the corrugated post-tensioning duct, although, in other implementations, the corrugated post-tensioning ducts have a square, rectangular, ovate, triangular, or any other suitable hollow shape cross section as viewed in a plane perpendicular to the central axis.

Each of the component openings 1120, 1220 of the first and second concrete components 1110, 1210 has an inner surface 1122, 1222 that has a tapered recessed portion 1124, 1224, respectively. Each of the tapered recessed portions 1124, 1224 of the respective inner surfaces 1122, 1222, extends from its respective duct opening 1104, 1204 toward the outer surface 1112, 1212 of the respective concrete component 1110, 1210. The tapered recessed portions 1124, 1224 taper radially outwardly in a direction from the respective duct opening 1104, 1204 toward the respective outer surface 1112, 1212. In other words, a diameter of each tapered recessed portion at the duct opening is smaller than a diameter of the tapered recessed portion adjacent the outer surface of the concrete component. In FIG. 1, the tapered recessed portions 1124, 1224 extend to the respective outer surface 1112, 1212. When a post-tensioning tendon is inserted through one of the first or second corrugated post-tensioning ducts 1100, 1200 and across the gap 1250 between the first and second concrete components 1110, 1210, the tapered recessed portions 1124, 1224 act as funnels to guide the post-tensioning tendon into the other of the second or first corrugated post-tensioning ducts 1100, 1200 such that the post-tensioning tendons are less likely to get snagged or hung when entering the other corrugated post-tensioning duct.

As shown in FIG. 1, the tapered recessed portions 1124, 1224 are frustoconical, but in other implementations, the tapered recessed portion is frustospherical or any other tapering shape.

Figure 3:
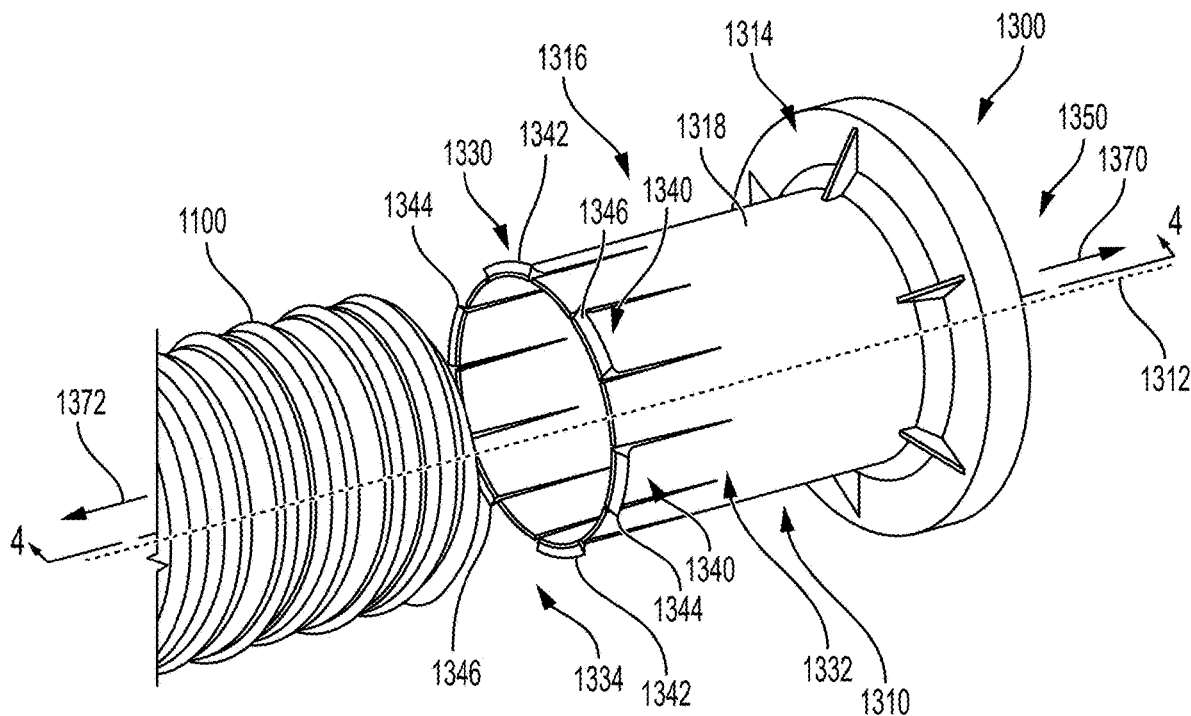
FIG. 3 is a perspective view of the duct coupler and the corrugated post-tensioning duct of FIG. 1.
Figure 4:
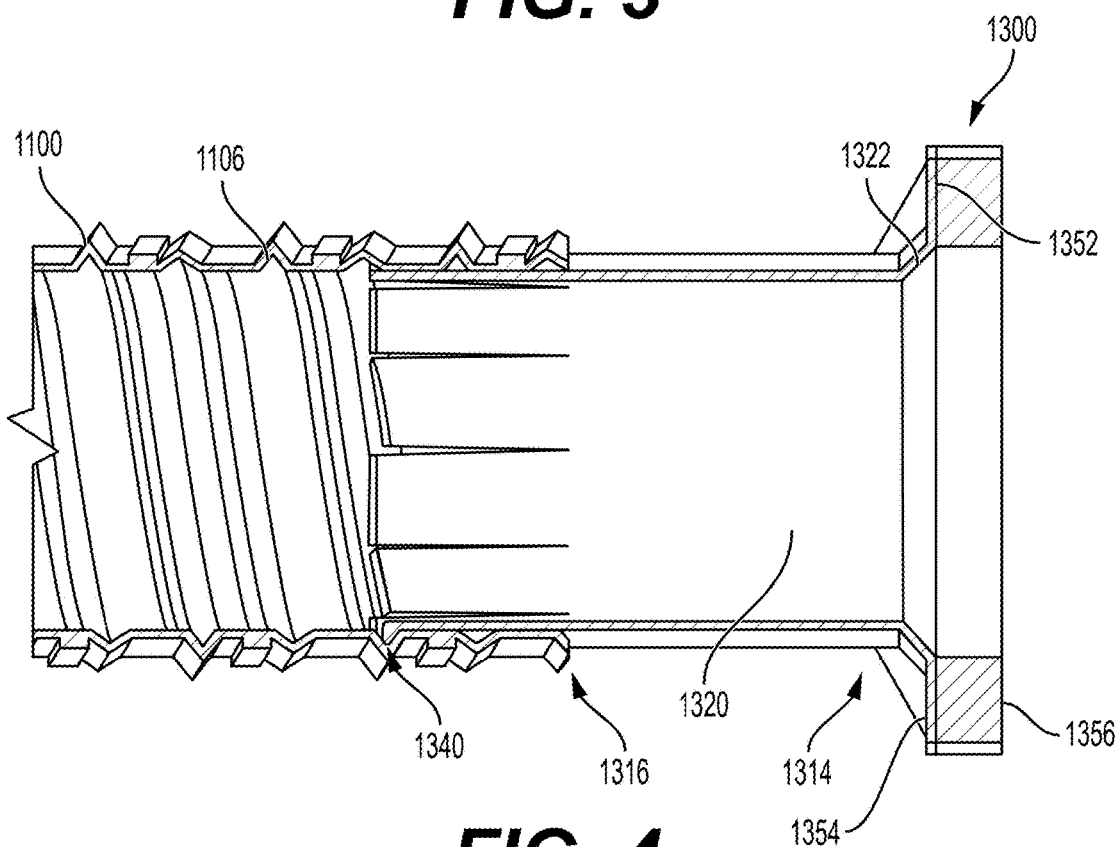
FIG. 4 is a side cross-sectional view of the duct coupler and corrugated post-tensioning duct of FIG. 3 along line 4-4.

FIGS. 3 and 4 illustrate an example duct coupler 1300 according to one implementation. The duct coupler 1300 can be engaged with a duct, such as ducts 1100, 1200 described above. The duct coupler 1300 includes a tubular coupler body 1310, twelve arms 1330, six teeth 1340, and a coupler flange 1350.

The tubular coupler body 1310 has a central axis 1312, a first end 1314, a second end 1316 opposite and axially spaced apart from the first end 1314, and a wall 1318 extending between the first end 1314 and the second end 1316. The first end 1314 of the tubular coupler body 1310 faces a first axial direction 1370, and the second end 1316 of the tubular coupler body 1310 faces a second axial direction 1372.

The wall 1318 includes an inner surface 1320 that includes a flared portion 1322. The flared portion 1322 includes the first end 1314 of the tubular coupler body 1310. The flared portion 1322 is angled 45 degrees relative to the central axis 1312 such that the flared portion 1322 has the largest cross-sectional area of the wall 1318 in a plane perpendicular to the central axis 1312 at the first end 1314. The flared portion 1322 is configured to smoothly guide a post-tensioning tendon as the end of the post-tensioning tendon is transitioning between aligned corrugated post-tensioning ducts 1100, 1200. In other implementations, the inner surface of the wall does not include a flared portion or includes a flared portion that is angled between 0 and 90 degrees relative to the central axis of the tubular coupler body.

While the tubular coupler body 1310 in FIGS. 1-4 has a hollow circular cross section as viewed in a plane perpendicular to the central axis 1312, in other implementations, the tubular coupler body has a square, rectangular, ovate, triangular, or any other hollow shape cross section as viewed in a plane perpendicular to the central axis. As used herein, the terms "radially" and "circumferentially" apply to any cross-sectional shape and are not limiting to only circular cross sections and shapes (e.g., square, rectangular, ovate, triangular, or any other hollow shape cross section as viewed in a plane perpendicular to the central axis). For example, "circumferentially" as used herein may include any perimetrical boundary of a shape, and "radially" as used herein may include the direction between a central axis and the perimetrical boundary in a plane perpendicular to the central axis.

Each arm 1330 has a fixed end 1332 and a free end 1334 opposite and axially spaced apart from the fixed end 1332. Each fixed end 1332 is coupled to the second end 1316 of the tubular coupler body 1310 and extends axially therefrom. As shown, the arms 1330 extend in an axial direction from the second end 1316, but in other implementations, the direction that the arms extend may include an axial and radial component. Each of the plurality of arms 1330 are evenly circumferentially spaced along the second end 1316 of the tubular coupler body 1310.

The six teeth 1340 are coupled to and extend radially outwardly from the free ends 1334 of every other arm 1330.

Each of the six teeth 1340 is directly diametrically opposed from another of the six teeth 1340, forming three pairs of diametrically opposed sets of teeth 1342, 1344, 1346.

As shown in the cross-sectional view of FIG. 4, each of the six teeth 1340 extend helically along the respective free end 1334 at a helical angle that corresponds to a helical angle of the corrugation 1106, 1206 of the corrugated duct 1100, 1200 such that the six teeth 1340 are configured to be disposed within and engage the corrugation 1106, 1206 of the corrugated duct 1100, 1200.

Each tooth 1340 also axially tapers as the tooth 1340 extends radially outwardly such that each tooth 1340 has the largest width in the axial direction at the free end 1334 of its arm 1330 that decreases as the tooth 1340 extends radially outwardly. The axial taper of each tooth 1340 is shaped such that when at least one of the pairs of diametrically opposed teeth 1342, 1344, 1346 are engaged with the corrugation 1106 of the corrugated duct 1100, the pair of diametrically opposed teeth allow the duct coupler 1300 to move in the first axial direction 1370 with less axial force than moving the duct coupler 1300 in the second axial direction 1372.

Each of the six teeth 1340 are axially spaced from the second end 1316 of the coupler body 1310 such that, when the duct coupler 1300 is disposed within the corrugated post-tensioning duct 1100, a first pair of diametrically opposed teeth 1342 engages the corrugation 1106 of the corrugated post-tensioning duct 1100 at the same time while the second and third pairs of diametrically opposed teeth 1344, 1346 do not engage the corrugation 1106.

Each of the free ends 1334 of the twelve arms 1330 is resiliently biased radially outwardly and urgeable radially inwardly. When axial force is applied in the first direction 1370, the axial taper of the first pair of diametrically opposed teeth 1342 cause the arms 1330 of the first pair of diametrically opposed teeth 1342 to move radially inwardly, allowing the duct coupler 1300 to move in the first direction 1370. As the first pair of diametrically opposed teeth 1342 disengage the corrugation 1106 of the corrugated post-tensioning duct 1100, the second pair of diametrically opposed teeth 1344 engage the corrugation 1106 of the corrugated post-tensioning duct 1100 and the first and third pairs of diametrically opposed teeth 1342, 1346 are disengaged from the corrugation 1106. When further axial force is applied in the first direction 1370, the axial taper of the second pair of diametrically opposed teeth 1344 cause the arms 1330 of the second pair of diametrically opposed teeth 1344 to move radially inwardly, allowing the duct coupler 1300 to further move in the first direction 1370. As the second pair of diametrically opposed teeth 1344 disengage the corrugation 1106 of the corrugated post-tensioning duct 1100, the third pair of diametrically opposed teeth 1346 engage the corrugation 1106 of the corrugated post-tensioning duct 1100 and the first and second pairs of diametrically opposed teeth 1342, 1344 are disengaged from the corrugation 1106.

Thus, the resilient arms 1330 and tapered angle of the teeth 1340 allow for a ratcheting effect with the corrugation 1106 of the corrugated duct 1100 as the duct coupler 1300 is moved in the first direction 1370. Furthermore, because only one of the three pairs of diametrically opposed teeth engages the corrugation 1106 at a time, the duct coupler 1300 is able to ratchet along the corrugation 1106 at a higher definition (i.e., the duct coupler 1300 engages each pass of the corrugation 1106 at three different axial positions).

The helical angle of the each of the teeth 1340 allow the duct coupler 1300 to be rotated in a first circumferential direction about the central axis 1312 to cause the duct coupler 1300 to move in the first axial direction 1370. Thus, once a duct coupler 1300 has been extended across the gap between the first and second concrete components 1110, 1210 using the ratcheting function, the duct coupler 1300 can be rotated to tighten the duct coupler 1300 against the second component 1210. Similarly, rotation of the duct coupler 1300 in a second circumferential direction opposite the first circumferential direction about the central axis 1312 causes the duct coupler 1300 to move in the second axial direction 1372 such that the duct coupler 1300 can be retracted back into the corrugated duct 1100.

Figure 5:
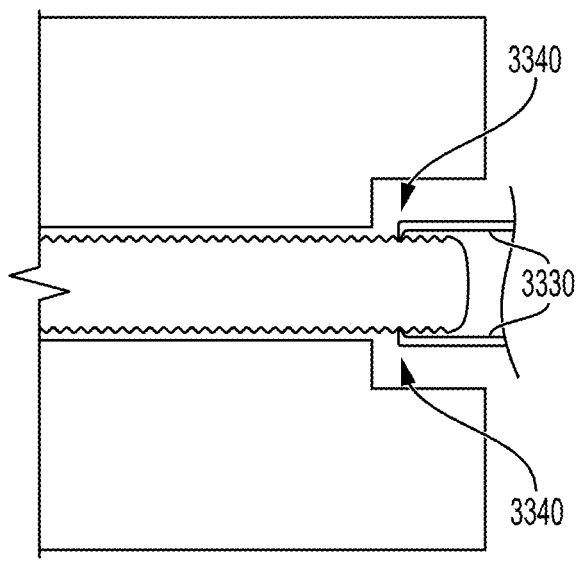
FIG. 5 is a side view of a duct system, according to another implementation.

Although the duct coupler 1300 in FIGS. 1-4 includes twelve arms 1330 and six teeth 1340, in other implementations, the duct coupler includes two or more arms. In addition, in some implementations, pairs of teeth may be coupled to pairs of arms (one tooth per arm). Although the implementation of the duct coupler 1300 shown in FIGS. 1-4 has three sets of diametrically opposed teeth 1342, 1344, 1346, in other implementations, the duct coupler has any number of teeth, such as one, two, four, or more sets of diametrically opposed teeth. In FIGS. 1-4, the helical angle of each of the teeth 1340 is 10 degrees, but in other implementations, the helical angle ranges from greater than 0 degrees to 30 degrees. Although each tooth 1340 of the duct coupler 1300 shown in FIGS. 1 and 2 extends radially outwardly and each of the arms 1330 are urgeable radially inwardly, in other implementations, each tooth 3340 extends radially inwardly and each of the arms 3330 are urgeable radially outwardly, as shown in FIG. 5.

Although the teeth 1340 shown in FIGS. 1-4 extend radially outwardly from the free ends 1332 of alternating arms 1330, in other implementations, the teeth extend radially outwardly or inwardly from any location between the fixed end and the free end of the arms. In some implementations, diametrically opposed teeth do not engage the corrugation simultaneously, and a first tooth and a second tooth are configured such that the second tooth does not engage the corrugation of the corrugated duct when the first tooth is engaging the corrugation of the corrugated duct.

The coupler flange 1350 has a first side 1352 facing the first direction 1370 and a second side 1354 facing the second direction 1372. The coupler flange 1350 extends radially outwardly from the first end 1314 of the tubular coupler body 1310, and the first side 1352 of the coupler flange 1350 includes a coupler flange seal 1356. The coupler flange seal 1356 shown in FIGS. 3 and 4 increases the sealing capability of the coupler flange 1350 to prevent grout from entering either the first or second corrugated ducts 1100, 1200. The coupler flange seal 1356 shown in FIGS. 3 and 4 has a circular shaped radial outer surface. The coupler flange seal 1356 defines a circular shaped opening therethrough that aligns with the opening of the duct coupler 1300 at the first end 1314.

Although the coupler flange seal 1356 shown in FIGS. 3 and 4 includes a foam material, in other implementations, the coupler flange seal includes a cork material, a rubber material, or any other material capable of preventing grout from entering into the duct.

In FIGS. 3 and 4, the coupler flange seal 1356 is coupled to the first side 1352 of the coupler flange 1350. However, in other implementations, the coupler flange seal is coupled to any portion of the coupler flange. In other implementations, the duct coupler does not include a flange, or the first end of the tubular coupler body includes the coupler flange seal. In other implementations, the coupler flange does not include a coupler flange seal.

Figure 2:
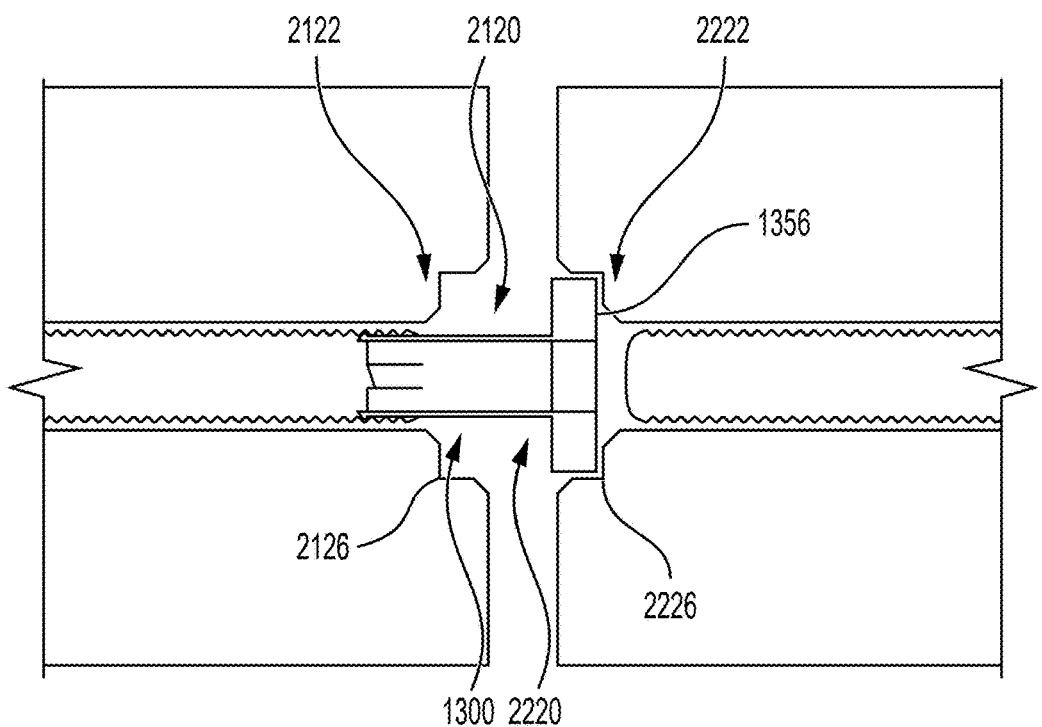
FIG. 2 is a side view of a duct system, according to another implementation.

The outer diameter of the coupler flange 1350 is greater than the inner diameter of the corrugated post-tensioning ducts 1100, 1200 and less than the diameter of the component opening 1120, 2120, and the coupler flange seal 1350 of the duct coupler 1300 is configured to abut the inner surface 1222 of the tapered recessed portion 1224 of the second component opening 1220, as shown in FIG. 1. In another implementation, as shown in FIG. 2, the inner surfaces 2122, 2222 of both the component openings 2120, 2220 include a shoulder 2126, 2226, and the coupler flange seal 1356 abuts the shoulder 2226.

Various implementations include a method for coupling concrete structural elements. A first concrete component is disposed adjacent a second concrete component. The first concrete component includes an embedded first corrugated post-tensioning duct, and the second concrete component includes an embedded second corrugated post-tensioning duct. The first and second concrete components are disposed such that the first and second corrugated post-tensioning ducts are aligned with each other. A duct coupler is disposed within the end of the first corrugated post-tensioning duct such that the first set of diametrically opposed teeth engage the corrugation of the first corrugated post-tensioning duct.

The duct coupler is then ratcheted in the first axial direction such that the duct coupler extends from the first corrugated post-tensioning duct and across the gap to the outer surface of the second concrete component. The duct coupler can be rotated in a first circumferential direction to cause the duct coupler to further move in the first axial direction such that the flange seal creates a tight seal against the second concrete component.

Grout is then poured within the gap defined between the outer surfaces of the first and second concrete components to couple the first and second concrete components to each other. A post-tensioning tendon can then be inserted through the first corrugated post-tensioning duct, through the duct coupler, and into the second corrugated post-tensioning duct.

FIGS. 6-12 show another implementation of a duct coupler system 4000. The system 4000 includes a first concrete component 4110, a second concrete component 4210, a first corrugated post-tensioning duct 4100, a second corrugated post-tensioning duct 4200, a first duct adapter 4400, a second duct adapter 4500, and a duct coupler 4300. The first corrugated post-tensioning duct 4100 and the first duct adapter 4400 are both embedded in the first concrete component 4110, and the second corrugated post-tensioning duct 4200 and the second duct adapter 4500 are both embedded in the second concrete component 4210. The duct coupler 4300 is inserted within the first duct adapter 4400.

Figure 6:
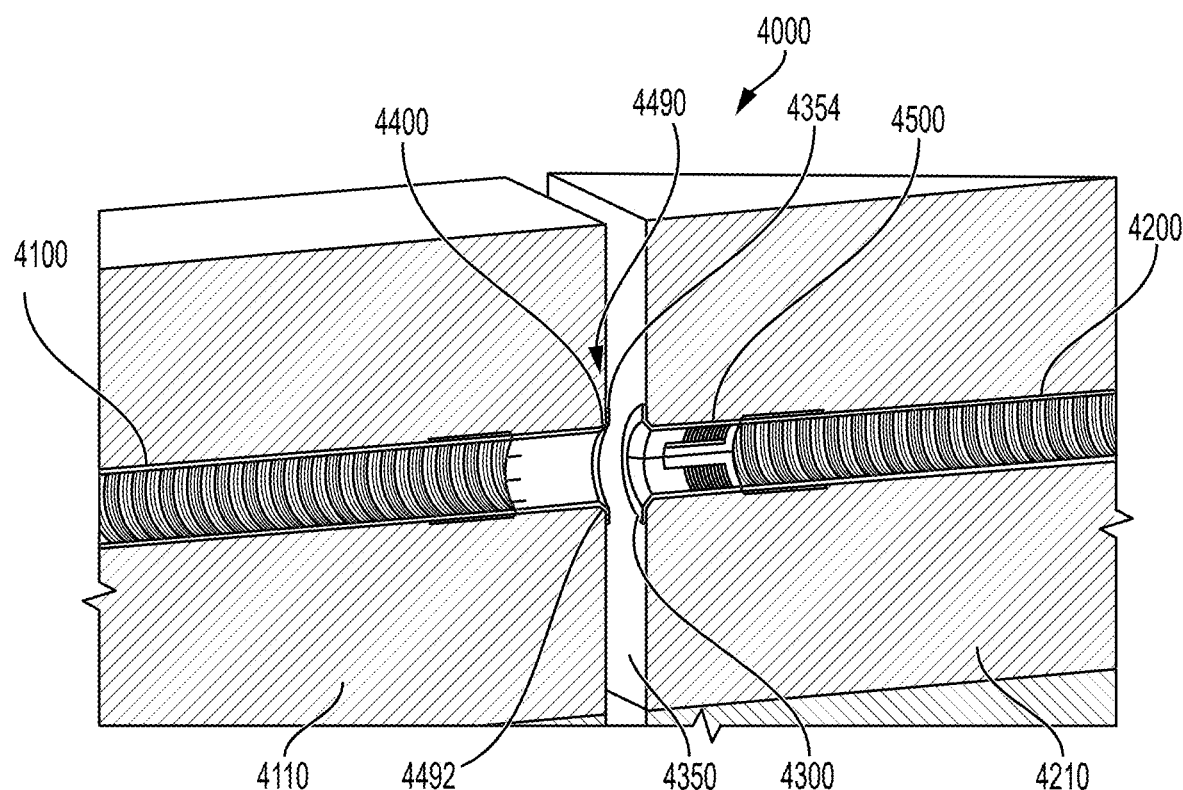
FIG. 6 is a perspective view of a duct system, according to another implementation.

The first concrete component 4110 and the second concrete component 4210 are aligned such that the first corrugated post-tensioning duct 4100, first duct adapter 4400, second corrugated post-tensioning duct 4200, second duct adapter 4500, and duct coupler 4300 share a central axis as shown in FIG. 6.

The first duct adapter 4400 and the second duct adapter 4500 each include a tubular adapter body 4410 and an adapter flange 4490.

The tubular adapter body 4410 has an adapter central axis 4412, a duct engagement portion 4420, a coupler engagement portion 4430 opposite and axially spaced apart from the duct engagement portion 4420, and an adapter wall 4450 with an inner surface 4452. Although the duct adapters 4400, 4500 shown in FIGS. 6-12 have a single cylindrical adapter wall 4450 with one inner surface 4452, in other implementations, the adapter wall can be any suitable shape having two, three, or more inner surfaces.

The duct engagement portion 4420 is disposed around an outer surface 4108 of the end 4102 of the corrugated post-tensioning duct 4100 such that the corrugated post-tensioning duct 4100 stays in the duct engagement portion 4420. Also, the inner surface 4452 of the adapter wall 4450 further includes a shoulder 4422 disposed between the coupler engagement portion 4430 and the duct engagement portion 4420. The shoulder 4422 extends radially inwardly from the inner surface 4452 of the adapter wall 4450, and the end 4102 of the corrugated post-tensioning duct 4100 abuts the shoulder 4422 when the tubular adapter body 4410 is disposed around the outer surface 4108 of the corrugated duct 4100.

The coupler engagement portion 4430 includes a first end 4432, a second end 4434 opposite and spaced apart from the first end 4432 along the adapter central axis 4412. The coupler engagement portion 4430 defines a plurality of circumferentially extending grooves 4436 and four axially extending channels 4440. The plurality of circumferentially extending grooves 4436 is defined between the first end 4432 and the second end 4434 of the coupler engagement portion 4430. The four axially extending channels 4440 divide the plurality of circumferentially extending grooves 4436 into four axially spaced sets of grooves 4438.

The coupler engagement portion 4430 further defines a circumferential channel 4442 adjacent the second end 4434 of the coupler engagement portion 4430 and the plurality of circumferentially extending grooves 4436. The circumferential channel 4442 circumferentially extends along the entire circumference of the second end 4434 of the coupler engagement portion 4430.

The coupler engagement portion 4430 also includes a stop protrusion 4444. The stop protrusion 4444 axially extends adjacent one of the four axially spaced sets of grooves 4438 and into the circumferential channel 4442 such that the teeth 4340 of the duct coupler 4300 are prevented from over-rotating past the axially spaced sets of grooves 4438.

The coupler engagement portion 4430 is configured to be coupled to the duct coupler 4300.

Figure 9A:
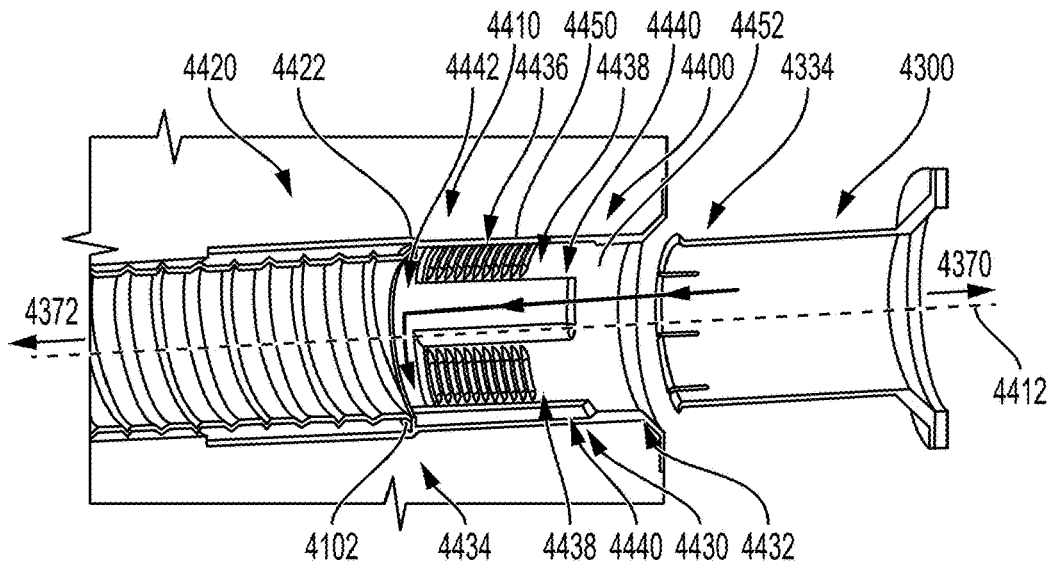
FIGS. 9A-9C are detailed views of a duct coupler of the system of FIG. 6 being inserted into a duct adapter.
Figure 9B:
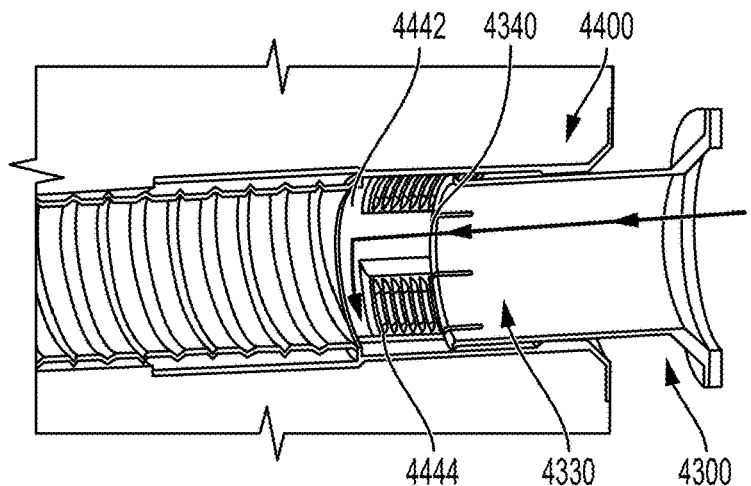
Figure 9C:
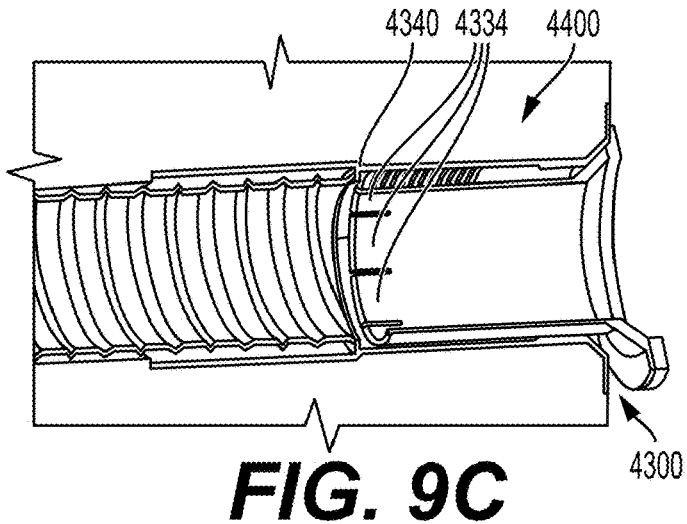

The duct coupler 4300 of the system 4000 as shown in detail in FIGS. 9A-9C is similar to the duct coupler 1300 shown in FIGS. 1-4. However, the duct coupler 4300 shown in FIGS. 9A-9C includes four teeth 4340 that extend circumferentially around their respective free end 4334 rather than extending helically.

Furthermore, the four teeth 4340 of the duct coupler 4300 shown in FIG. 9A-9C are slidably disposable within the four axially extending channels 4440 and circumferential channel 4442 and then engageable with the plurality of circumferentially extending grooves 4436. Each of the four teeth 4340 are axially spaced from the second end 4316 of the coupler body 4310 such that, when the duct coupler 4300 is disposed within the duct adapter 4400 such that each of the four teeth 4340 are aligned with one of the four axially spaced sets of grooves 4438, each tooth 4340 engages with one of the four axially spaced sets of grooves 4438 at the same time. However, in other implementations, a first set of diametrically opposed teeth 4340 engage two of the axially spaced sets of grooves 4438 at the same time while a second set of diametrically opposed teeth 4340 are not engaged with any of the axially spaced sets of grooves 4438.

In other implementations, the teeth extend helically or extend at any angle that corresponds to the angle of the plurality of grooves.

In some implementations, the inner surface of the adapter wall defines one, two, three, or any amount of grooves that corresponds or does not correspond to the number of teeth of the duct coupler.

In some implementations, the inner surface of the adapter wall defines one or more grooves, and the one or more grooves includes one or more threads.

Although the plurality of grooves 4436 is defined only along a portion of the inner surface 4452 of the adapter wall 4450 in the first and second duct adapters 4400, 4500, in other implementations, one or more grooves extend circumferentially around the entirety of the inner surface of the adapter wall. In other implementations, the inner surface of the adapter includes any number of non-grooved parts.

Although the inner surface 4452 of the adapter wall 4450 in FIGS. 6-12 defines four channels 4440 to correspond to the four teeth 4340 of the duct coupler 4300, in other implementations, the inner surface of the adapter wall defines one, two, three, or more channels, no channels, or any number of channels such that the duct coupler is capable of being slidably disposed within the coupler engagement portion of the duct adapter.

Figure 10:
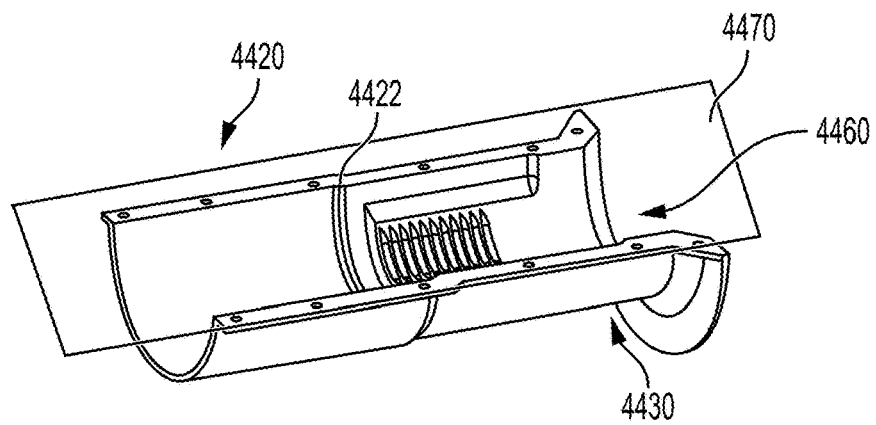
FIG. 10 is a detailed view of a portion of the duct adapter of the system of FIG. 6.
Figure 11:
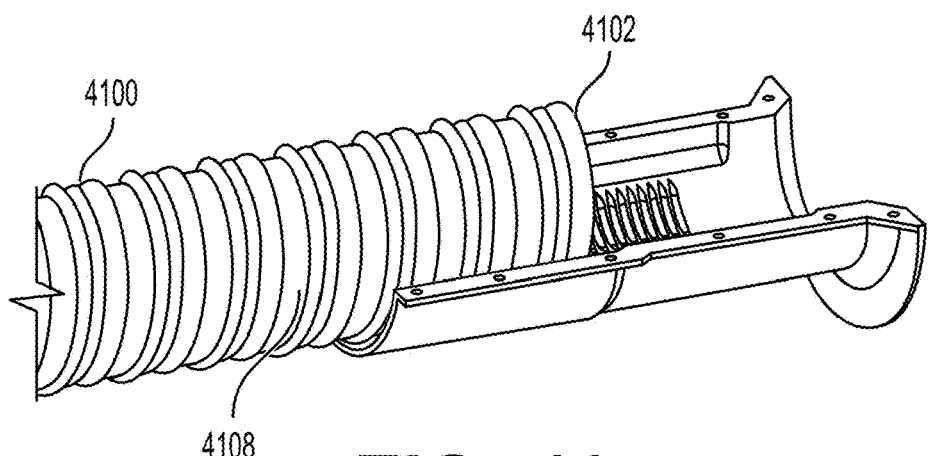
FIG. 11 is a detailed view of the portion of the duct adapter shown in FIG. 10 disposed on an end of a corrugated post-tensioning duct.
Figure 12:
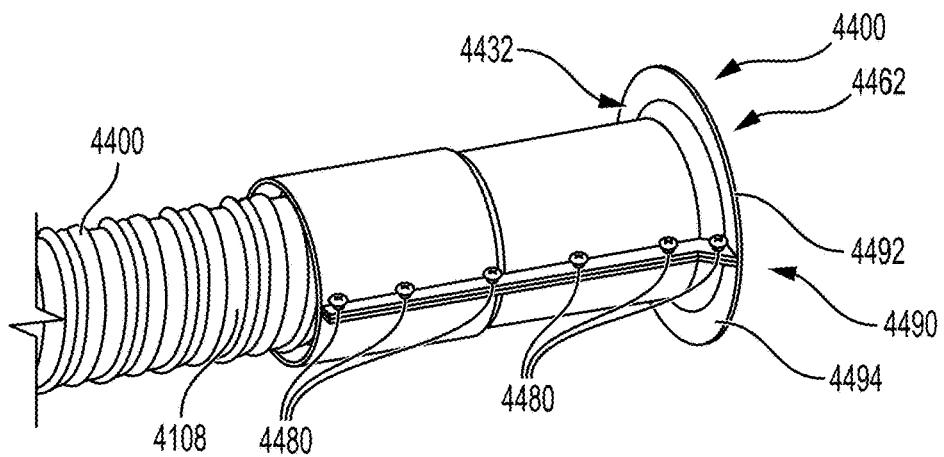
FIG. 12 is a detailed view of the duct adapter shown in FIG. 10 disposed on an end of a corrugated post-tensioning duct.

As shown in FIGS. 10-12, the tubular adapter body 4410 of the duct adapter 4400 is bisected into a first portion 4460 and a second portion 4462. The first portion 4460 and the second portion 4462 are coupled to each other along a plane 4470 that includes the adapter central axis 4412 such that the duct engagement portions 4420 of the first portion 4460 and the second portion 4462 of the tubular adapter body 4410 circumferentially surround the end 4102 of the corrugated post-tensioning duct 4100. The first portion 4460 and the second portion 4462 are coupled to each other by a plurality of mechanical fasteners 4480.

In other implementations, the tubular adapter body is in only one portion or is separated into more than two portions. In other implementations, the first portion and the second portion are coupled to each other through an interference fit, one or more clips, an adhesive, welding, or any other mechanism capable of coupling the first portion of the tubular adapter body to the second portion of the tubular adapter body.

Figure 7:
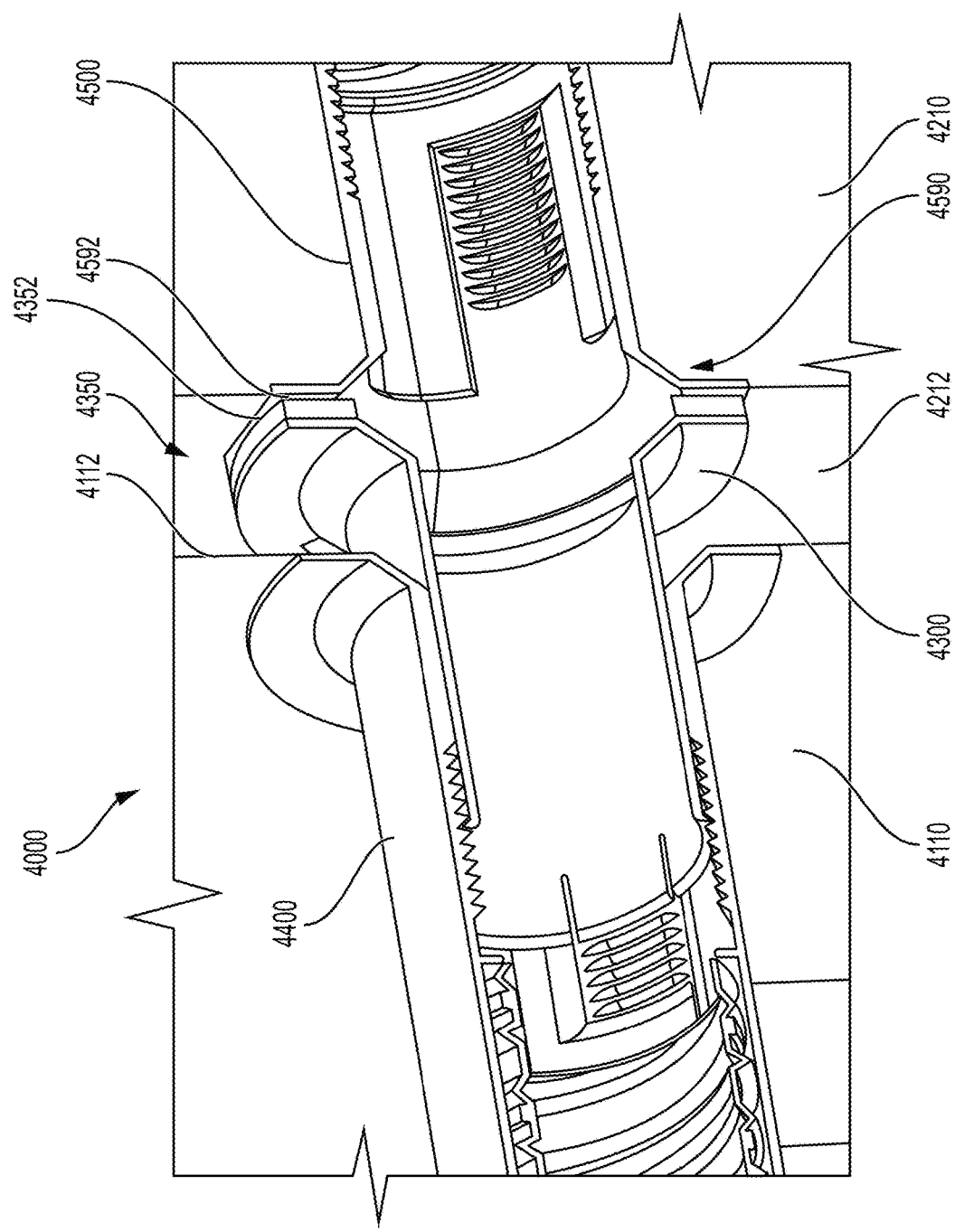
FIG. 7 is a detailed view of the duct system of FIG. 6.
Figure 8:
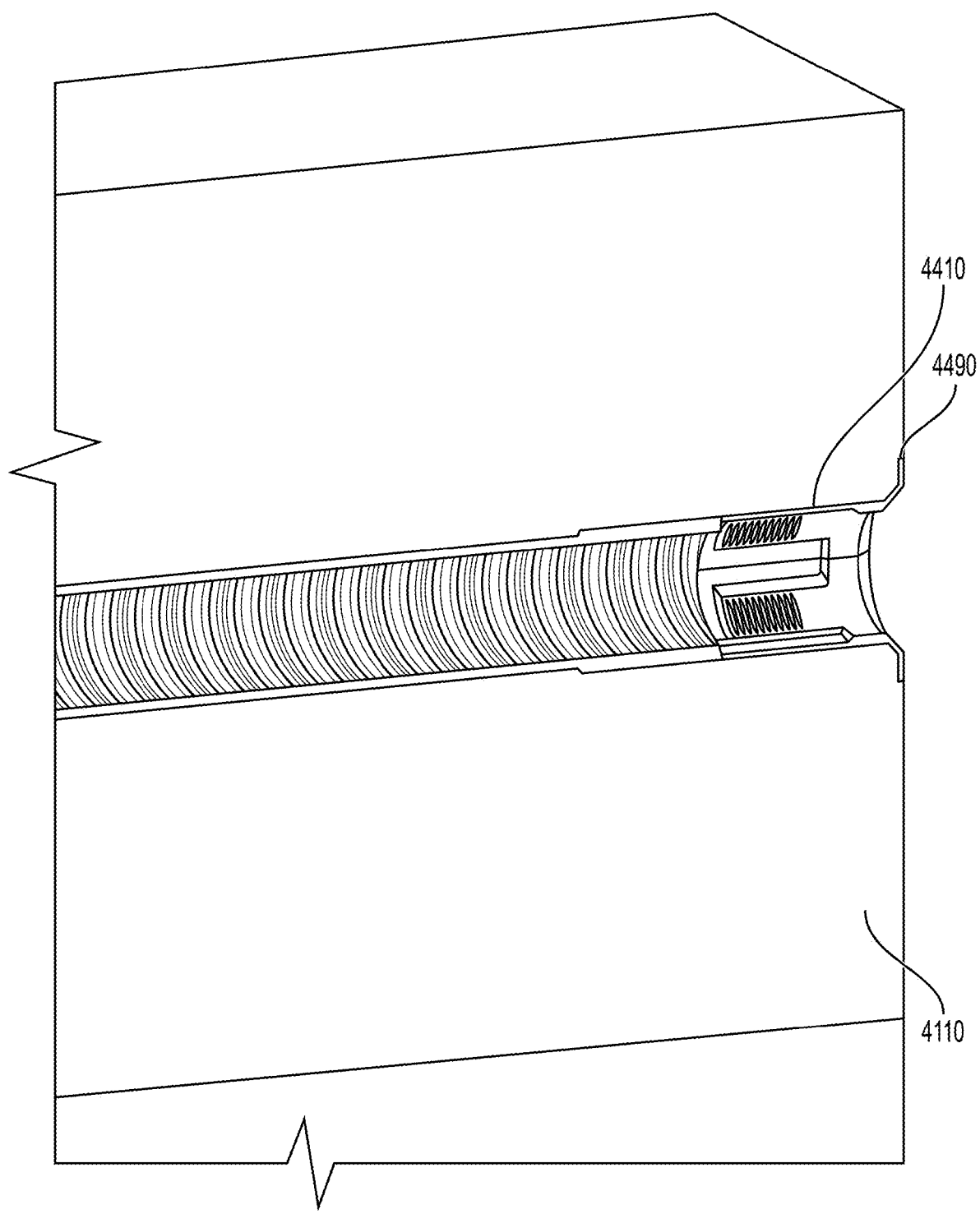
FIG. 8 is a perspective view of a portion of the duct system of FIG. 6.

The adapter flange 4490 extends radially outwardly from the first end 4432 of the coupler engagement portion 4430 and has a first side 4492 and a second side 4494. When the duct coupler 4300 is fully inserted into the first duct adapter 4400 as shown in FIG. 6, the first side 4492 of the adapter flange 4490 of the first duct adapter 4400 is adjacent the second side 4354 of the coupler flange 4350. When the duct coupler 4300 is subsequently ratcheted away from the first duct adapter 4400 as shown in FIG. 7, the first side 4352 of the coupler flange 4350 abuts the first side 4592 of the adapter flange 4590 of the second duct adapter 4500. The second sides 4494, 4594 of both of the adapter flanges 4490, 4590 are adjacent to at least a portion of the outer surface 4112, 4212 of the concrete component 4110, 4210 in which they are embedded.

FIGS. 9A-9C show the duct coupler 4300 of FIGS. 6 and 7 being inserted into the first duct adapter 4400. As shown in FIG. 9A, the four teeth 4340 of the duct coupler 4300 are aligned with the axially extending four channels 4440 of the duct adapter 4400. The duct coupler 4300 is then inserted into the duct adapter 4400, as shown in FIG. 9B. Once the free ends 4334 of the arms 4330 and/or the teeth 4340 of the duct coupler 4300 are disposed within the circumferential channel 4442, the duct coupler 4300 is rotated such that one of the teeth 4340 coupled to a free end 4334 of one the arms 4330 abuts the stop protrusion 4444 within the circumferential channel 4442 of the coupler engagement portion 4430 of the duct adapter 4400, as shown in FIG. 9C. The stop protrusion 4444 prevents the duct coupler 4300 from over-rotating further along the circumferential channel 4442 at a location such that, when translated axially in the first axial direction 4370, the four teeth 4340 of the duct coupler 4300 are each aligned with one of the four sets of axially spaced sets of grooves 4438. The teeth 4340 are engaged with the circumferentially extending grooves 4436 by advancing the duct coupler 4300 in the first axial direction 4370. Once the duct coupler 4300 is inserted within the duct adapter 4400, the system 4000 shown in FIGS. 6-12 can be used to couple adjacent precast concrete components in a similar way as discussed above with reference to FIGS. 1-4. However, in the system 4000 shown in FIGS. 6-12, the duct coupler 4300 is axially forced in the first axial direction 4370 toward the second concrete component 4210 with, for example, a pry bar such that the duct coupler 4300 ratchets toward the second concrete component 4210 and abuts the first side 4592 of the adapter flange 4590 of the second duct adapter 4500. The duct coupler 4300 seals the first duct adapter 4400 to the second duct adapter 4500 such that grout cannot enter either the first corrugated post-tensioning duct 4100 or the second corrugated post-tensioning duct 4200 and such that a post-tensioning tendon can be threaded therethrough.

A number of implementations have been described. Nevertheless, it will be understood that various modifications may be made without departing from the spirit and scope of the claims. Accordingly, other implementations are within the scope of the following claims.

Certain terminology is used herein for convenience only and is not to be taken as a limitation on the present claims. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," and "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A duct coupler comprising:
   a tubular coupler body having a central axis, a first end, a second end axially spaced apart from the first end, and a wall extending between the first end and the second end, wherein the first end faces a first axial direction, and the second end faces a second axial direction;
   a first arm and a second arm, each arm having a fixed end and a free end, wherein the fixed end is coupled to the second end and extends axially therefrom, and the free end is axially spaced apart from the fixed end, wherein each of the free ends are resiliently urgeable in a radial direction; and
   a first tooth and a second tooth, the first tooth being coupled to and extending radially from the first arm and the second tooth being coupled to and extending radially from the second arm,
   wherein the first tooth is shaped such that, in a first configuration where the first tooth is engaged with a corrugation of a corrugated duct, the first tooth allows the duct coupler to move in the first axial direction with less axial force than moving the duct coupler in the second axial direction,
   wherein the second tooth is shaped such that, in a second configuration where the second tooth is engaged with the corrugation of the corrugated duct, the second tooth allows the duct coupler to move in the first axial direction with less axial force than moving the duct coupler in the second axial direction, and
   wherein the first tooth and the second tooth do not simultaneously engage the corrugation of the corrugated duct.

2. The duct coupler of claim 1, wherein the teeth extend radially outwardly.

3. The duct coupler of claim 1, wherein the teeth extend radially inwardly.

4. The duct coupler of claim 1, further comprising a flange that extends radially outwardly from the first end, wherein the flange comprises a flange seal.

5. The duct coupler of claim 1, wherein the first tooth extends radially from the free end of the first arm and the second tooth extends radially from the free end of the second arm.

6. The duct coupler of claim 1, wherein a distal end of the first tooth is axially spaced apart from the second end of the tubular coupler body a first length, and a distal end of the second tooth is axially spaced apart from the second end of the tubular coupler body a second length, wherein the first and the second lengths are different.

7. The duct coupler of claim 1, wherein the first tooth and the second tooth are diametrically opposed.

8. The duct coupler of claim 1, wherein each of the teeth extend helically along respective free ends thereof, and wherein teeth extend helically along the respective free end at a helical angle corresponding to a helical angle of the corrugation of the corrugated duct.

9. The duct coupler of claim 1, wherein the teeth are shaped such that, when at least one of the teeth is engaged with the corrugation of the corrugated duct, rotation of the duct coupler in a first circumferential direction about the central axis causes the duct coupler to move in the first axial direction and rotation of the duct coupler in a second circumferential direction opposite the first circumferential direction about the central axis causes the duct coupler to move in the second axial direction.

10. The duct coupler of claim 1, wherein an inner surface of the wall includes a flared portion, wherein the flared portion includes the first end.

11. The duct coupler of claim 1, wherein the tubular coupler body is a circular shape as viewed in a plane perpendicular to the central axis.

12. The duct coupler of claim 1, wherein the tubular coupler body is a square shape as viewed in a plane perpendicular to the central axis.

13. The duct coupler of claim 1, further comprising a third arm, a fourth arm, a third tooth coupled to and extending radially from the third arm, and a fourth tooth coupled to and extending radially from the fourth arm, wherein the first tooth and the third tooth are configured to engage the corrugation of the corrugated duct simultaneously, the second tooth and the fourth tooth are configured to engage the corrugation of the corrugated duct simultaneously, and the first tooth and the third tooth do not engage the corrugation of the corrugated duct when the second tooth and the fourth tooth are engaging the corrugation of the corrugated duct.

14. The duct coupler of claim 13, wherein the first tooth and the third tooth are diametrically opposed, and the second tooth and the fourth tooth are diametrically opposed.

15. A duct coupler system, the system comprising:
    a duct coupler comprising:
      a tubular coupler body having a body central axis, a first end, a second end axially spaced apart from the first end, and a wall extending between the first end and the second end, wherein the first end faces a first axial direction and the second end faces a second axial direction,
      a first arm and a second arm, each arm having a fixed end and a free end, wherein the fixed end is coupled to the second end and extends axially therefrom, and the free end is axially spaced apart from the fixed end, wherein each of the free ends are resiliently urgeable in a radial direction, and
      a first tooth and a second tooth, the first tooth being coupled to and extending radially from the first arm and the second tooth being coupled to and extending radially from the second arm; and
    a duct adapter comprising:
      a tubular adapter body having an adapter central axis, a coupler engagement portion, and a duct engagement portion axially spaced apart from the coupler engagement portion, and an adapter wall, wherein the adapter wall has an inner surface, wherein the inner surface of the adapter wall of the coupler engagement portion defines one or more grooves, wherein the duct engagement portion is configured to be coupled to an end of a duct,
      wherein the first tooth is shaped such that, in a first configuration where the first tooth is engaged with the one or more grooves of the adapter wall, the first tooth allows the duct coupler to move in the first axial direction with less axial force than moving the duct coupler in the second axial direction,
      wherein the second tooth is shaped such that, in a second configuration where the second tooth is engaged with the one or more grooves of the adapter wall, the second tooth allows the duct coupler to move in the first axial direction with less axial force than moving the duct coupler in the second axial direction, and wherein the first tooth and the second tooth do not simultaneously engage the one or more grooves of the adapter wall.

16. The system of claim 15, wherein the one or more grooves comprises one or more threads.

17. The system of claim 15, wherein the one or more grooves extend circumferentially.

18. The system of claim 15, wherein the tubular adapter body comprises a first portion and a second portion, the first portion and the second portion being coupled to each other along a plane that includes the adapter central axis.

19. The system of claim 15, wherein the coupler engagement portion of the duct adapter further comprises a plurality of axially extending channels each defined between a different set of the one or more grooves.

20. The system of claim 15, wherein the duct adapter is embedded in a concrete component.

21. The system of claim 20, wherein the duct adapter is a first duct adapter and the concrete component is a first concrete component, the system further including a second duct adapter embedded in a second concrete component, wherein the adapter central axis of the first duct adapter is aligned with an adapter central axis of the second duct adapter.

22. The system of claim 15, wherein the coupler engagement portion of the duct adapter further comprises an axially extending channel defined between the one or more grooves.

23. The system of claim 22, wherein the first tooth of the duct coupler is slidably disposable within the axially extending channel of the duct adapter.

24. The system of claim 23, wherein the coupler engagement portion of the duct adapter further comprises a circumferential channel adjacent to the second end of the coupler engagement portion.

25. The system of claim 24, wherein, once the first tooth of the duct coupler slides along the axially extending channel towards the second end of the coupler engagement portion, the duct coupler is configured to rotate such that the first tooth rotates within the circumferential channel to align with the one or more grooves and the first tooth then engages with the one or more grooves.

26. The system of claim 25, wherein the coupler engagement portion of the duct adapter further comprises a stop protrusion axially extending adjacent to the circumferential channel such that one of the first tooth or the second tooth of the duct coupler is prevented from over-rotating past the one or more grooves.

27. A duct coupling system comprising:
a duct system comprising:
a precast concrete component having an outer surface defining a component opening, the component opening having an inner surface; and
a duct embedded within the precast component, the duct having a duct end defining a duct opening, wherein the duct end is spaced apart from the outer surface such that the component opening is in communication with the duct opening,
wherein the inner surface of the component opening includes a tapered recessed portion adjacent the duct opening; and
the duct coupler of claim 1, wherein an outer diameter of the first end is greater than an inner diameter of the duct and the first end is configured to abut the inner surface of the component opening.

28. The duct coupling system of claim 27, wherein the first end is configured to abut the tapered recessed portion of the inner surface.

* * * * *